July 22, 1958      J. B. DICK      2,844,382
SIMPLIFIED IDLER ARM ADJUSTER
Filed Aug. 27, 1954
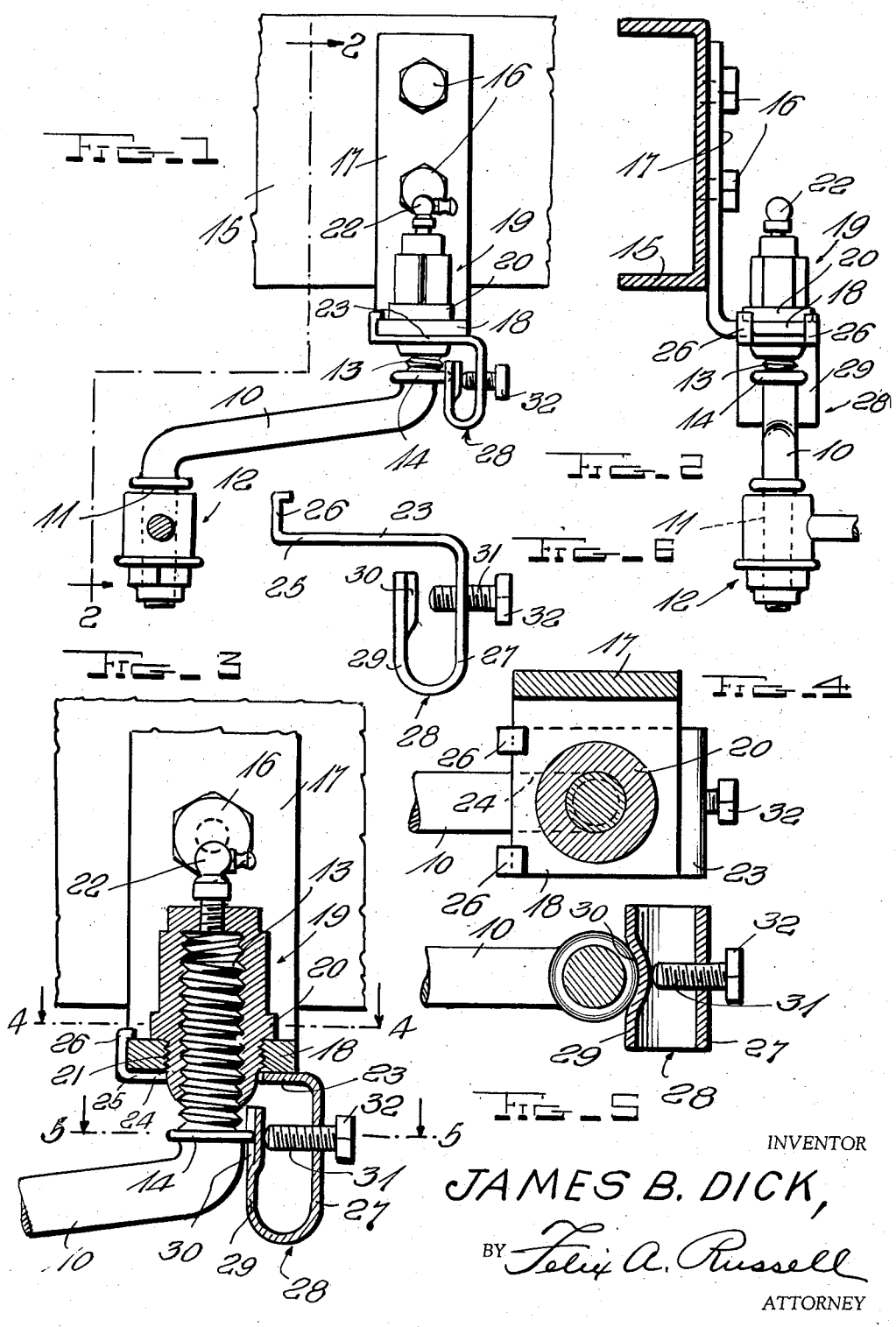
INVENTOR
JAMES B. DICK,
BY Felix A. Russell
ATTORNEY

United States Patent Office 2,844,382
Patented July 22, 1958

2,844,382

SIMPLIFIED IDLER ARM ADJUSTER

James B. Dick, Birmingham, Ala.

Application August 27, 1954, Serial No. 452,572

5 Claims. (Cl. 280—95)

The present invention relates to a simplified idler arm adjuster and it consists in the combinations, constructions and arrangements of parts herein described and claimed.

Generally the present device constitutes a continuation in part of my co-pending application, Serial No. 436,309, filed June 14, 1954, for Improved Idler Arm Adjuster. The present device comprises a horizontal arm one end of which is provided with a slot dividing the same into a pair of legs the outer ends of which are upturned to form hooks which are adapted to engage a conventional bracket when the legs straddle the bearing block of the idler arm. The other end of the horizontal arm has integrally connected thereto the outer leg of a U-shaped member whose inner leg is provided with an indentation which is rounded and adapted to receive therein a flange found conventionally upon an idler arm. A bolt extends through the outer leg of the U-shaped member and is adapted to bear against the inner leg thereof whereby to tension such inner leg against the idler arm to thereby eliminate looseness in the latter. The device is such that it may be quickly and easily attached to the idler arm assembly of a great many of the present day automobiles.

It is accordingly an object of the invention to provide a device of the character set forth which is simple in construction, inexpensive to manufacture and yet effective and efficient in use.

Another object of the invention is to provide, in a device of the character set forth, novel means for mounting the same upon an idler arm assembly.

Still another object of the invention is to provide, in a device of the character set forth, novel adjustable tensioning means forming a part of the invention.

It is a further object of the invention to provide a device of the character set forth which occupies a minimum of space.

Other and further objects of the invention will become apparent from a reading of the following specification taken in conjunction with the drawing, in which:

Figure 1 is an elevational view of an embodiment of the invention showing the same in operative position upon an idler arm assembly of an automobile.

Figure 2 is a sectional view taken substantially along line 2—2 of Figure 1,

Figure 3 is an enlarged vertical sectional view, partly in elevation and partly broken away, of the device illustrated in Figures 1 and 2, Figure 4 is a sectional view taken along line 4—4 of Figure 3, Figure 5 is a sectional view taken along line 5—5 of Figure 3, and Figure 6 is a side elevational view, somewhat enlarged, of the device of the present invention shown removed from the idler arm assembly.

Referring more particularly to the drawing, there is shown therein an idler arm 10 the lower end of which is provided with an integrally formed dependent threaded pin 11 which is connected in any suitable manner as generally indicated at 12 to the conventional tie rods (not shown).

Th upper end of the idler arm 10 is likewise provided with a vertically extending threaded pin 13 having an integrally formed flange 14 at the lower end thereof.

A portion of an automobile frame is indicated at 15 and has affixed thereto by bolts 16 or the like an L-shaped bracket 17, the horizontal portion of which is designated by the reference character 18.

A bearing block is generally indicated at 19 and, in spaced relation to the lower end thereof is provided with an annular shoulder 20 which rests upon the upper face of the horizontal portion 18 of the bracket 17. The member 19 has that portion thereof below the shoulder 20 threaded through the horizontal portion 18, as indicated at 21. That portion of the member 19 above the shoulder 20 is provided with wrench-engaging faces and is preferably and as shown hexagonal in cross sectional area. A grease-receiving coupling member 22 is threadably mounted in the upper end of the member 19.

The device of the present invention comprises a horizontally extending arm 23 having a slot 24 in one end portion thereof which slot divides the same into a pair of legs 25 the outer ends of which are bent to form hooks 26.

The other end of the horizontal arm 23 has integrally formed therewith an outer leg 27 of a dependent U-shaped member generally indicated at 28 which is provided with a foreshortened inner leg 29 having an indentation 30 in its upper end portion for the reception therein of the flange 14. A bolt 31 extends threadably through the leg 27 and is adapted to bear against the inner side of the leg 29 and is provided at its outer end with a head 32.

In operation, it will be apparent that the device of the present invention which is shown unattached in Figure 6, may be attached to an idler arm assembly by first allowing the legs 25 to straddle that portion of the member 19 which lies below the member 18 while at the same time allowing the hooks 26 to embrace one side of the horizontal portion 18 of the member 17. When this is accomplished, it will be apparent that the rounded indentation 30 will receive therein the flange 14 and, because of the inherent elasticity of the present device which is preferably formed of spring metal, the leg 29 will bear against the flange 14 thereby urging the pin 13 to the left as viewed in Figure 3 while at the same time the hooks 26 will act to urge the member 19 to the right as viewed in Figure 3. To increase the tension thus applied, it is only necessary to thread the bolt 31 inwardly through the arm 27 until it bears against the leg 29 thus applying additional pressure upon the flange 14 and a reverse pressure on the arms 26. Thus it will be seen that the pin 13 will be held in the member 19 without rattling or the like even though the threads thereon may have become worn.

While but one form of the invention has been shown and described herein, it will be readily apparent to those skilled in the art that many minor modifications may be made without departing from the spirit of the invention or the scope of the appended claims.

I claim:

1. A device of the character described comprising a horizontal arm having a slot in one end thereof defining a pair of legs, a hook formed integrally with the free end of each of said legs, a U-shaped member having a relatively large leg integrally connected to the other end of the horizontal arm, and a bolt extending through said relatively large leg and bearing against the other leg of said U-shaped member.

2. A device of the character described comprising a horizontal arm having a slot in one end thereof defining a pair of legs, a hook formed integrally with the free end of each of said legs, a U-shaped member having a relatively large leg integrally connected to the other end of the horizontal arm, and a bolt extending through said relatively long leg and bearing against the other leg of said U-shaped member, said other leg of said U-shaped member having an indentation adjacent the free end thereof.

3. In combination with an idler arm assembly including a bracket having a horizontal portion, a bearing block extending vertically through said horizontal portion, and an idler arm having an upwardly extending pin threadably mounted in said block, the provision of an adjuster comprising a horizontal arm having a centrally disposed slot in one end thereof defining a pair of legs adapted to encompass said block, a hook formed at the free end of each of said legs and adapted to encompass one side of said horizontal portion, a U-shaped member having an outer leg formed integrally with the other end of said horizontal arm, and an inner leg adapted to bear against said pin.

4. A device as defined in claim 3 wherein said pin is provided with a flange at the lower end thereof and wherein said inner arm is provided with an indentation adapted to partially receive said flange therein.

5. A device as defined in claim 4 wherein a bolt extends through said outer arm and bears against said inner arm.

References Cited in the file of this patent

UNITED STATES PATENTS

| | | |
|---|---|---|
| 381,043 | Vauclain | Apr. 10, 1888 |
| 399,447 | Stiles | Mar. 12, 1889 |
| 583,816 | Redfield | June 1, 1897 |
| 606,085 | Redfield | June 21, 1898 |
| 915,735 | Brown | Mar. 23, 1909 |
| 977,507 | Brown | Dec. 6, 1910 |
| 1,281,769 | Edmonston | Oct. 15, 1918 |
| 1,361,838 | Doty | Dec. 14, 1920 |
| 1,473,177 | Coyne | Nov. 6, 1923 |
| 2,650,844 | Shemorry | Sept. 1, 1953 |